(12) United States Patent
Parmentier et al.

(10) Patent No.: US 12,000,310 B2
(45) Date of Patent: Jun. 4, 2024

(54) STATOR ASSEMBLY

(71) Applicant: SAFRAN, Paris (FR)

(72) Inventors: Nicolas Claude Parmentier, Moissy-Cramayel (FR); William Henri Joseph Riera, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 18/271,539

(22) PCT Filed: Jan. 4, 2022

(86) PCT No.: PCT/FR2022/050019
§ 371 (c)(1),
(2) Date: Jul. 10, 2023

(87) PCT Pub. No.: WO2022/148928
PCT Pub. Date: Jul. 14, 2022

(65) Prior Publication Data
US 2024/0052751 A1 Feb. 15, 2024

(30) Foreign Application Priority Data
Jan. 11, 2021 (FR) ........................................ 2100204

(51) Int. Cl.
*F01D 9/04* (2006.01)
*B64C 11/00* (2006.01)

(52) U.S. Cl.
CPC .............. *F01D 9/042* (2013.01); *B64C 11/00* (2013.01); *F05D 2220/36* (2013.01)

(58) Field of Classification Search
CPC ..... F01D 9/00; F01D 9/02; F01D 9/04; F01D 9/041; F01D 9/042; F01D 5/146; B64C 11/00; F05D 2220/36; F05D 2240/10
See application file for complete search history.

(56) References Cited

U.S. PATENT DOCUMENTS 3,536,414 A * 10/1970 Smith, Jr. ............. F04D 29/544
415/208.5
2006/0210395 A1 9/2006 Schuster et al.
2018/0017019 A1* 1/2018 DiPietro, Jr. ........... F01D 9/041

FOREIGN PATENT DOCUMENTS

EP 3 536 902 A1 9/2019
FR 3 090 033 A1 6/2020
WO WO-2014174214 A1 * 10/2014 ............... F02K 3/06

OTHER PUBLICATIONS

WO2014174214A1_MachineTranslation (Bouteiller, X.) Oct. 30, 2014. [retrieved on Mar. 6, 2024] Retrieved from: Espacenet. (Year: 2014).*
International Search Report issued May 25, 2022, in Application No. PCT/FR2022/050019.

* cited by examiner

*Primary Examiner* — Elton K Wong
(74) *Attorney, Agent, or Firm* — Sughrue Mion, PLLC

(57) ABSTRACT

A stator assembly including plural stator vanes distributed around an axis of revolution of the stator assembly, a chord of the stator vane, taken at a root of the stator vane, not overlapping, in the direction of the axis of revolution, a chord of an adjacent stator vane, taken at a root of the adjacent stator vane, and a chord of the stator vane, taken at a tip of the stator vane, overlapping, in the direction of the axis of revolution, a chord of the adjacent stator vane, taken at a tip of the adjacent stator vane.

12 Claims, 6 Drawing Sheets

FIG. 4-a
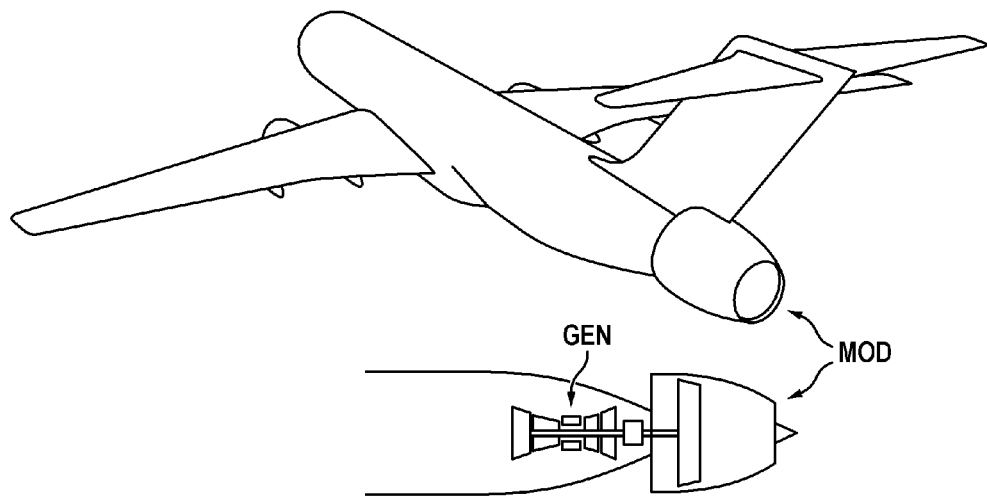
FIG. 4-b
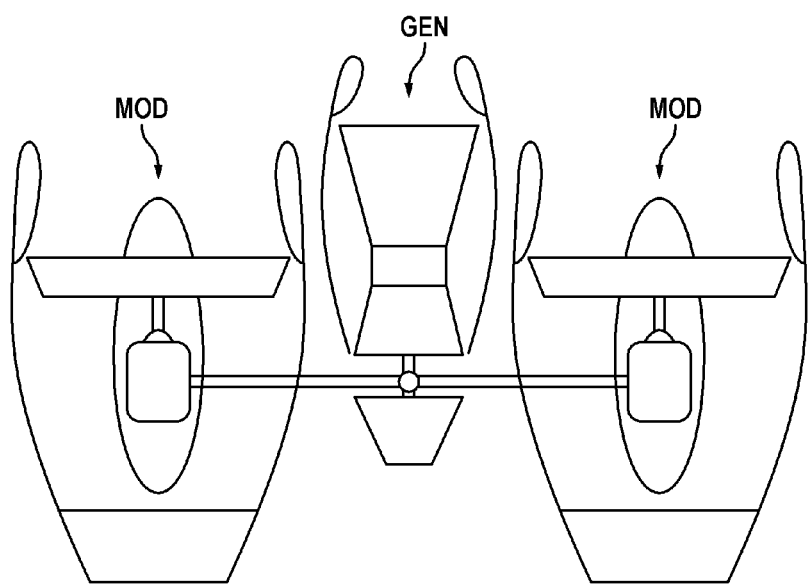

FIG. 4-c
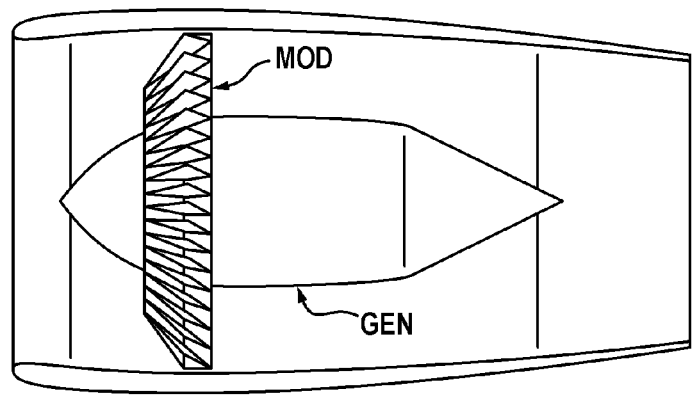
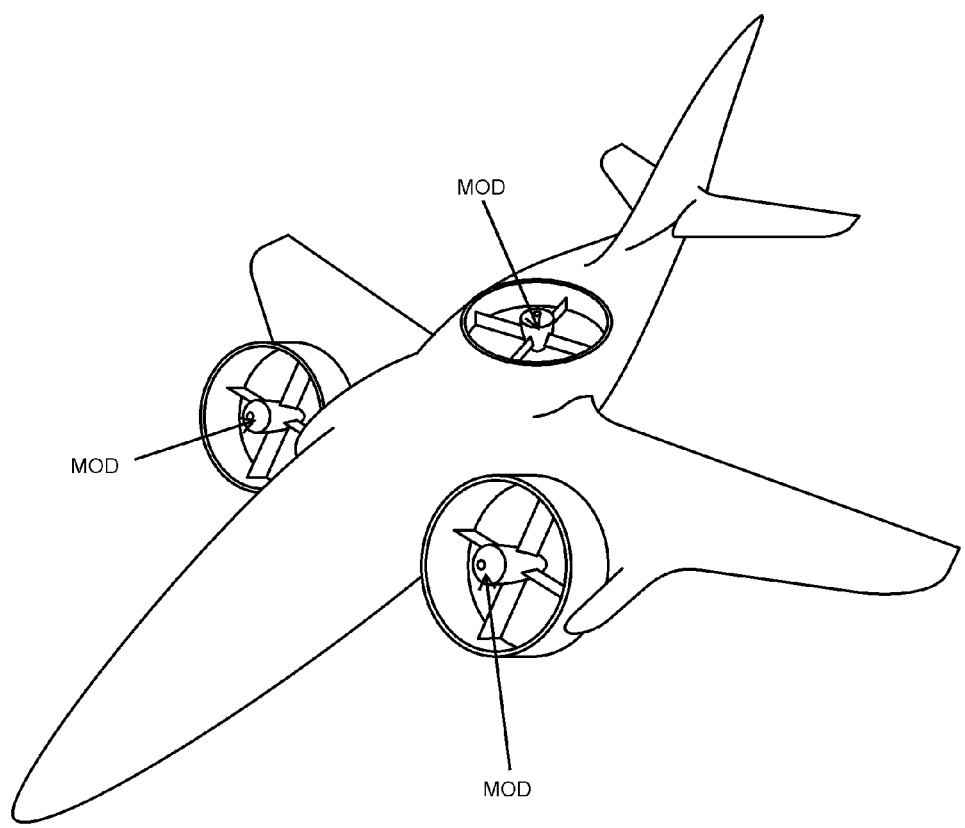

STATOR ASSEMBLY

CROSS REFERENCE TO RELATED APPLICATIONS

This application is a National Stage of International Application No. PCT/FR2022/050019 filed Jan. 4, 2022, claiming priority based on French Patent Application No. 2100204 filed Jan. 11, 2021, the contents of each of which being herein incorporated by reference in their entireties.

FIELD OF THE INVENTION

The present invention relates to a stator assembly. It relates more particularly to a stator assembly configured to straighten an air flow generated by a fan.

PRIOR ART

Stator assemblies, stator arrays or OGV for "outlet guide vane" allow straightening the air flow generated by the fan, while limiting the losses linked to this straightening.

FIG. 1 shows a known stator assembly ENS. This stator assembly ENS is comprised in a module MOD. The module MOD also comprises a fan SOU.

The fan SOU comprises fan blades AUBSOU configured to generate an air flow.

The stator assembly ENS comprises a plurality of stator vanes AUB. Each stator vane is attached at one end, called the root, connected to the hub MO. The other end of the stator vane AUB is called the tip end. The root and the tip of the stator vane AUB are then referred to.

In improving current engines, difficulties of the aerodynamic type are encountered in the stator assembly ENS. In fact, the number of stator vanes AUB must be sufficient to avoid the first acoustic modes which generate considerable noise. Moreover, the stator vanes AUB must be brought close together to guide the stream of the air flow, even at the tip where the distance between two consecutive stator vanes AUB is a maximum. The tip radius of the vanes is defined as being the radius between the tip of the stator vanes AUB and the center of the hub MO. The root radius of the vanes is defined as being the radius between the root of the stator vanes AUB and the center of the hub MO. When the stator vanes AUB are of a large size and the tip radius of the vanes is therefore large compared to the root radius of the vanes, a compromise must be found between:

- a number of vanes which allows having a distance between the tips of two consecutive stator vanes AUB that is sufficiently small, and
- a number of vanes which allows having a distance between the root of two consecutive stator vanes AUB sufficiently large to allow the integration of the different stator vanes AUB on the hub MO and which allows a sufficiently large air passage (also called an inter-vane channel) to avoid blocking the air flow passing through the stator assembly ENS.

Also known is French patent application FR-3 090 033 which describes a turbine engine in which a stator assembly is placed upstream of several bifurcations. These bifurcations, however, do not have the effect of straightening the flow and this straightening is accomplished mainly by the stator assembly. These bifurcations mainly have the effect of supplying a fairing integrating a certain number of elements connecting the engine to the airplane (of the piping, heat exchanger, electrical cable, mechanical drive shaft, structural parts of the engine suspension system, etc. type) and separating the air flow generated by the fan SOU into several sectors.

There is therefore a need for a new type of stator assembly for straightening an air flow allowing maximizing a distance separating the root of two successive vanes and minimizing a distance separating their tips.

DISCLOSURE OF THE INVENTION

To this end, what is provided according to the invention is a stator assembly for straightening an air flow comprising a plurality of stator vanes distributed around an axis of revolution of the stator assembly; for each stator vane, a chord of the stator vane, taken at the root of the stator vane, not overlapping, in the direction of the axis of revolution, a chord of an adjacent stator vane, taken at the root of the adjacent stator vane, and a chord of the stator vane, taken at the tip of the stator vane, overlapping, in the direction of the axis of revolution, a chord of the adjacent stator vane taken at the tip of the adjacent stator vane.

This stator assembly allows doubling the distance between the root of two successive vanes without changing the distance between their tips. This doubling facilitates the attachment of the vanes at the hub. This allows attaching the vanes more easily, in the case of engines with a high bypass ratio (UHBR for Ultra High Bypass Ratio), in the case of a fan driven by electric motors and in the case of engines without a primary compressor integrated downstream of the stator assembly, for example in the case of a single-channel engine.

Moreover, the leading edge of a part of the stator vanes is farther away from the trailing edge of the fan blades, which allows limiting the noise of the fan.

As a matter of fact, the shape of the outlet channel of the air can possibly be implemented smaller and therefore lead to a reduction of the primary torque of the engine and therefore of its mass. It is also possible to reduce the length of the nacelle by having more freedom in solutions for managing the acoustics of the engine.

Moreover, this arrangement facilitates the installation of the ejection opening allowing the extraction of primary air flow when the engine is operating, at idle for example. This ejection opening is also known by the expression Variable Bleed Valve VBV. Thus, the outlet grids of the discharge valve VBV duct are installed in proximity to the roots of the OGV in the secondary flow interior wall.

In one embodiment, a distance between the head of the stator vane and the axis of revolution is substantially identical for all the stator vanes.

In one embodiment, a distance between the root of the stator vane and the axis of revolution is substantially identical for all the stator vanes.

This embodiment is advantageous in the case of an engine in which the stator is on the same stream (secondary flow only for a double flow engine or single flow for an engine with a single flow) for example "single-flow" with offset gas generator.

In one embodiment a distance between the root of the stator vane and the axis of revolution, and a distance between the root of the adjacent stator vane and the axis of revolution are different.

This embodiment is advantageous in the case of an engine in which the OGV roots are in different stream (secondary flow) and upstream of the primary flow, for example a double flow engine.

Another aspect of the invention relates to a fan module which comprises a fan and a stator assembly as described above. The stator assembly is placed downstream of the fan.

Another aspect of the invention relates to a double flow engine comprising the stator assembly or the fan module. The double flow engine also comprises a power generator.

Another aspect of the invention relates to a single flow engine comprising the stator assembly or the fan module. The single flow engine also comprises a delocalized power generator.

Another aspect of the invention relates to an aircraft comprising a double flow engine or a single-flow engine.

DESCRIPTION OF THE FIGURES

Other features and advantages of the invention will also be revealed by the description that follows, which is purely illustrative and not limiting, and must be read with reference to the appended figures in which:

FIGS. 4-a to 4-c show aircraft implementing the second embodiment of the invention.

DETAILED DESCRIPTION OF THE INVENTION

Figure 1:
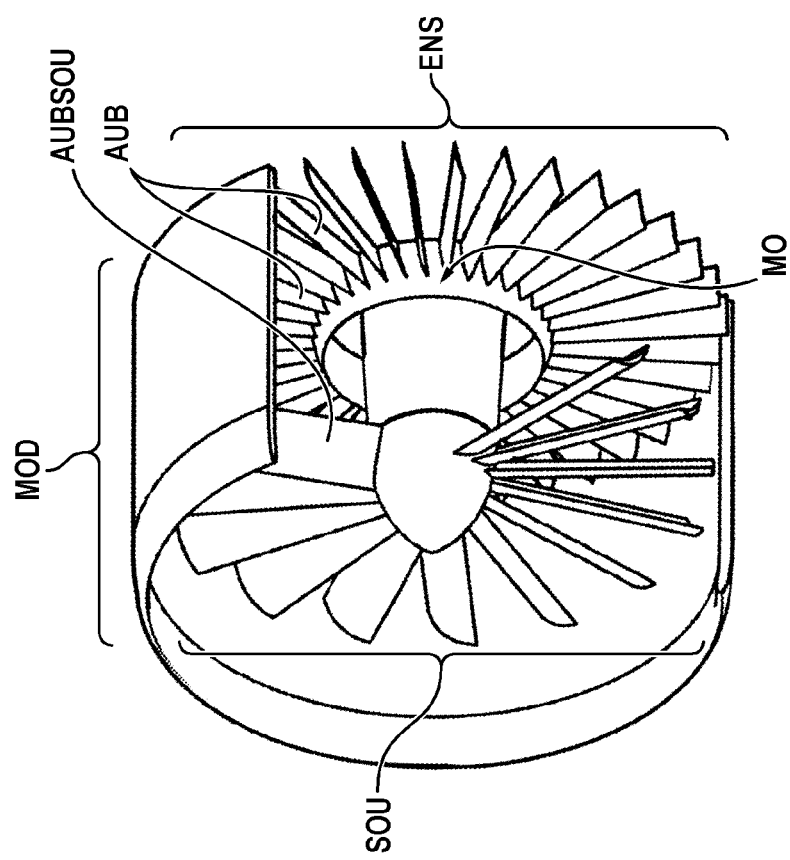
FIG. 1, described previously, shows a known stator assembly in a fan module.
Figure 2:
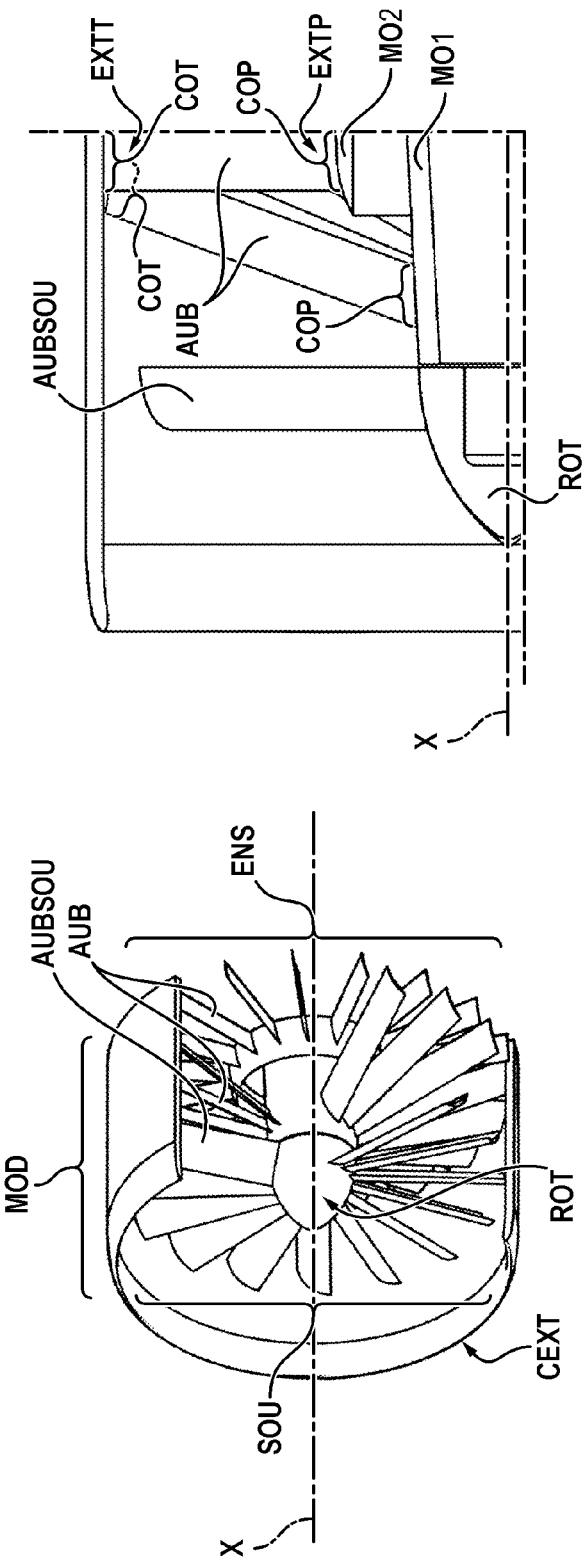
FIG. 2 shows a first embodiment of the invention.

FIG. 2 shows a fan module MOD comprising a fan SOU and a stator assembly ENS of the OGV, for "Outlet Guide Vane," type. This module is integrated into a turbine engine (not shown in FIG. 2) allowing for example the powering of an aircraft (not shown in FIG. 2).

Hereafter, upstream and downstream are defined relative to the normal flow direction of the air flow through the turbine engine, and more particularly through the fan SOU and the stator assembly ENS. The module MOD has a longitudinal axis X. The module MOD is substantially symmetrical relative to this axis X. An axial direction corresponds to the direction of the axis X. A radial direction is a direction perpendicular to this axis X and passing through it. Unless otherwise stated, the terms internal and external are used with reference to a radial direction such that the internal part or face of an element is closer to the axis X than the external part or face of the same element.

When the module MOD is integrated into the turbine engine, the module MOD is placed in the upstream part of the turbine engine.

The module MOD comprises a fan casing CEXT with a cylindrical shape. An axis of revolution of the fan casing CEXT is the axis X.

The fan SOU comprises a fan rotor ROT of which an upstream part has a substantially conical shape. The fan SOU comprises fan blades AUBSOU linked to the rotor ROT and extending radially until an area very close to the internal face of the exterior casing CEXT.

The fan SOU allows generating the flow passing through the turbine engine. The stator assembly ENS allows straightening the air flow coming from the fan SOU.

The stator assembly ENS comprises a plurality of stator vanes AUB which extend radially around the axis X.

The stator vanes AUB have a root EXTP located at an end of the stator vane AUB closest to the axis X and a tip EXTT located at an end of the stator vane AUB farthest away from the axis X. The stator vanes AUB have a leading edge, a trailing edge, a pressure side surface and a suction side surface. The stator vanes AUB have chords or camber lines extending from the leading edge to the trailing edge. The chord is the line halfway between the suction side surface and the pressure side surface of the vane AUB.

For each stator vane AUB, two adjacent stator vanes AUB are defined, one adjacent stator vane AUB in the clockwise direction and one adjacent stator vane AUB in the counter-clockwise direction. The clockwise and counter-clockwise directions are taken by considering the stator assembly ENS with the upstream part oriented toward the user.

The adjacent stator vane AUB in the clockwise direction at a first stator vane AUB is the stator vane AUB following the first stator vane AUB in the clockwise direction and for which the angle between a first axis perpendicular to the axis X and passing through the leading edge at the root of the first stator vane AUB and a second axis perpendicular to the axis X and running through the leading edge at the root of the adjacent stator vane AUB in the clockwise direction is a minimum.

The adjacent stator vane AUB in the counter-clockwise direction at a first stator vane AUB is the stator vane AUB following the first stator vane AUB in the counter-clockwise direction and for which the angle between a first axis perpendicular to the axis X and passing through the leading edge at the root of the first stator vane AUB and a second axis perpendicular to the axis X and passing through the leading edge at the root of the adjacent stator vane AUB in the counter-clockwise direction is a minimum.

The stator vanes AUB are equidistantly distributed around the axis X of revolution of the stator assembly ENS.

By distributed equidistantly, it is understood that an angle between a first axis perpendicular to the axis X and passing through the leading edge of a stator vane AUB and a second axis perpendicular to the axis X and passing through the leading edge of a stator vane AUB adjacent to the vane has a substantially constant absolute value, regardless of the stator vane AUB considered.

Regardless of the stator vane AUB considered, the chord COP at the root of the stator vane AUB considered does not axially overlap the chord COP at the root of a stator vane AUB adjacent to the stator vane AUB considered.

Regardless of the stator vane AUB considered, the chord COT at the tip of the stator vane AUB considered axially overlaps the chord COT at the tip of a stator vane AUB adjacent to the stator vane AUB considered.

For each stator vane AUB, the chord COP at the root axially overlaps the chord COP at the root of the stator vane AUB twice adjacent (clockwise or counter-clockwise) to the stator vane AUB considered.

By stator vane AUB twice adjacent in the clockwise direction to a first stator vane AUB, what is understood is the stator vane AUB adjacent in the clockwise direction to a clockwise stator vane AUB adjacent in the clockwise direction to the first stator vane AUB.

By stator vane AUB twice adjacent in the counter-clockwise direction to a first stator vane AUB, what is understood is the stator vane AUB adjacent in the counter-clockwise direction to a counter-clockwise stator vane AUB adjacent in the clockwise direction to the first stator vane AUB.

Thus, the stator vanes AUB are distributed in two groups of identical size. The stator vanes AUB of a first group have the leading edge, at the tip of the stator vane AUB, located at a first substantially identical axial position. The stator vanes AUB of a second group have the leading edge, at the tip of the stator vane AUB, located at a second substantially identical axial position. The first axial position is closer to the fan SOU than the second axial position. This first axial position is therefore upstream of the second axial position.

For each stator vane AUB, its clockwise adjacent stator vane belongs to a group different from the group of the stator vane AUB and its counter-clockwise adjacent stator vane belongs to a group different from the group of the stator vane AUB.

The stator vanes AUB are distributed around the axis X by alternately placing a stator vane of the first group and a stator vane AUB of the second group.

In FIG. 2, the stator vanes AUB of the first group are attached at the root to an external surface of a first hub MO1 with a substantially axisymmetric shape. An axis of revolution of the first hub MO1 is identical with the axis X. The first hub MO1 has a first diameter. The stator vanes AUB of the second group are attached at the root at the surface of a second hub MO2 also having a substantially axisymmetric shape. An axis of revolution of the second hub MO2 is identical to the axis X. The second hub MO2 has a second diameter.

The first diameter is smaller than the second diameter.

The first hub MO1 extends along the axis X starting at the fan SOU. The second hub MO2 extends along the axis X starting from a position downstream of the fan SOU. The upstream end of the second hub MO2 is called the splitter nose.

The space comprised between the external surface of the first hub MO1 and the internal surface of the second hub MO2 forms the beginning of a primary stream in which a primary flow circulates. The space comprised between the external surface of the second hub MO2 and the internal surface of the fan casing CEXT forms a secondary stream in which a secondary flow circulates.

Advantageously the module MOD has a diameter comprised between 25 and 130 inches (or between 63.5 cm and 330.2 cm) and includes between 10 and 26 fan blades AUBSOU.

Thus, in FIG. 2 the stator assembly ENS comprises an even number of stator vanes AUB which are grouped in two groups (one comprising even numbered stator vanes AUB and the other odd numbered stator vanes AUB). The position of the tip of the even and odd numbered stator vanes AUB is substantially unchanged (the successive stator vanes are close at the fan casing). The odd numbered stator vanes extend from the external casing to the internal flow surface while the even numbered stator vanes stop at the splitter nose (at the intermediate surface which breaks the flow in two). The edge of the nose is positioned axially between the leading edge of the even numbered stator vanes and the trailing edge of the odd numbered stator vanes.

Thus, the roots of the even and odd numbered stator vanes AUB are offset longitudinally so that the air flows between two stator vanes AUB of the same group. The odd numbered stator vanes AUB, placed upstream, first partly straighten the air flow, then the even numbered stator vanes AUB, placed downstream, complete the straightening.

For a constant inter-vane stream width at the tip of the stator vanes AUB, the width of the stream at the root of the stator vanes AUB is doubled, which makes possible the integration of a greater number of stator vanes AUB; it is possible, for example, to increase them by 5% to 10%.

The odd numbered stator vanes AUB straighten the entire air flow generated by the fan SOU, while the even numbered stator vanes AUB straighten only the secondary flow.

Figure 3:
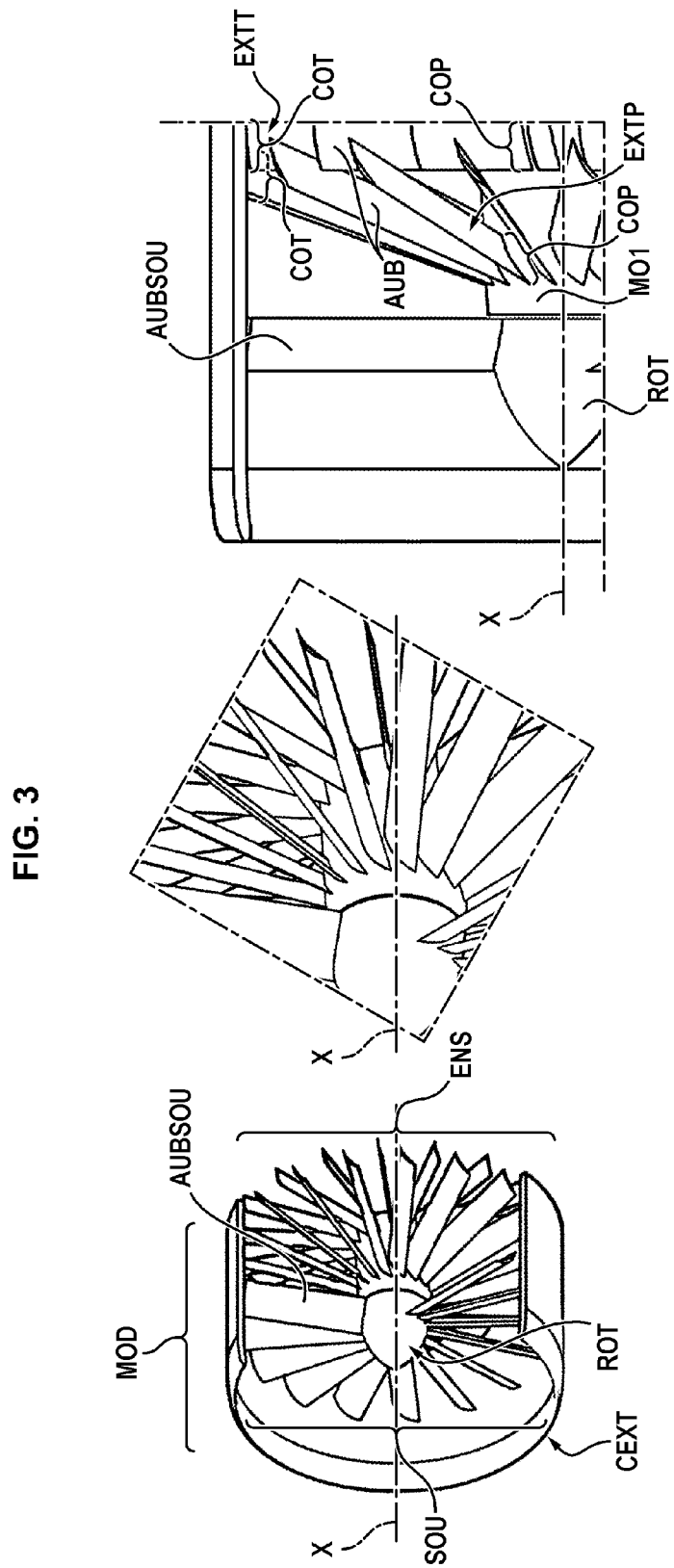
FIG. 3 shows a second embodiment of the module of the invention.

FIG. 3 shows an embodiment in which the stator assembly ENS comprises only the first hub MO1. All the stator vanes AUB are attached at the root to the external surface of a first hub MO1. As in FIG. 2, the stator vanes AUB of a first group have the leading edge, at the tip of the stator vane AUB, located at a substantially identical first longitudinal position. The stator vanes AUB of a second group have the leading edge at the tip of the stator vane AUB, located at a substantially identical second longitudinal position. The first longitudinal position is closer to the fan SOU than the second axial position.

In FIG. 3, an outer diameter of the rotor ROT of the fan SOU is substantially equal to the outer diameter of the hub MO1. Thus, in this case, the module MOD comprises only a single stream and this module MOD is connected to a delocalized power generator. The assembly, comprising the module MOD and the delocalized power generator, then forms a single-flow engine.

FIG. 3 therefore shows the module MOD comprising the fan SOU and the stator assembly ENS in a single-flow case. In the same way as in FIG. 2, the stator vanes AUB, still even in number, are grouped into two groups with a substantially unchanged position of the tips. The roots of the even and odd numbered stator vanes AUB are offset longitudinally. The module MOD has no splitter nose. The attachment of the stator vanes AUB at the root is carried out on the same external surface of the hub MO1, but at a different position, so that the leading edges of the even numbered stator vanes AUB is behind the trailing edge of the odd numbered stator vanes AUB.

FIGS. 4-a to 4-c show an assembly of this type comprising the module MOD and a delocalized power generator GEN. This delocalized power generator GEN can, for example, be a gas turbine, an electric motor or any device allowing supplying a rotation torque on a rotating shaft. The delocalized power generator GEN drives mechanically the module MOD via a transmission shaft. The power generator GEN can be placed outside the module MOD or be positioned in a nacelle comprising the module MOD (for example for a vertical takeoff aircraft, known by the acronym VTOL Vertical Takeoff and Landing, FIG. 4-c).

Figure 5:
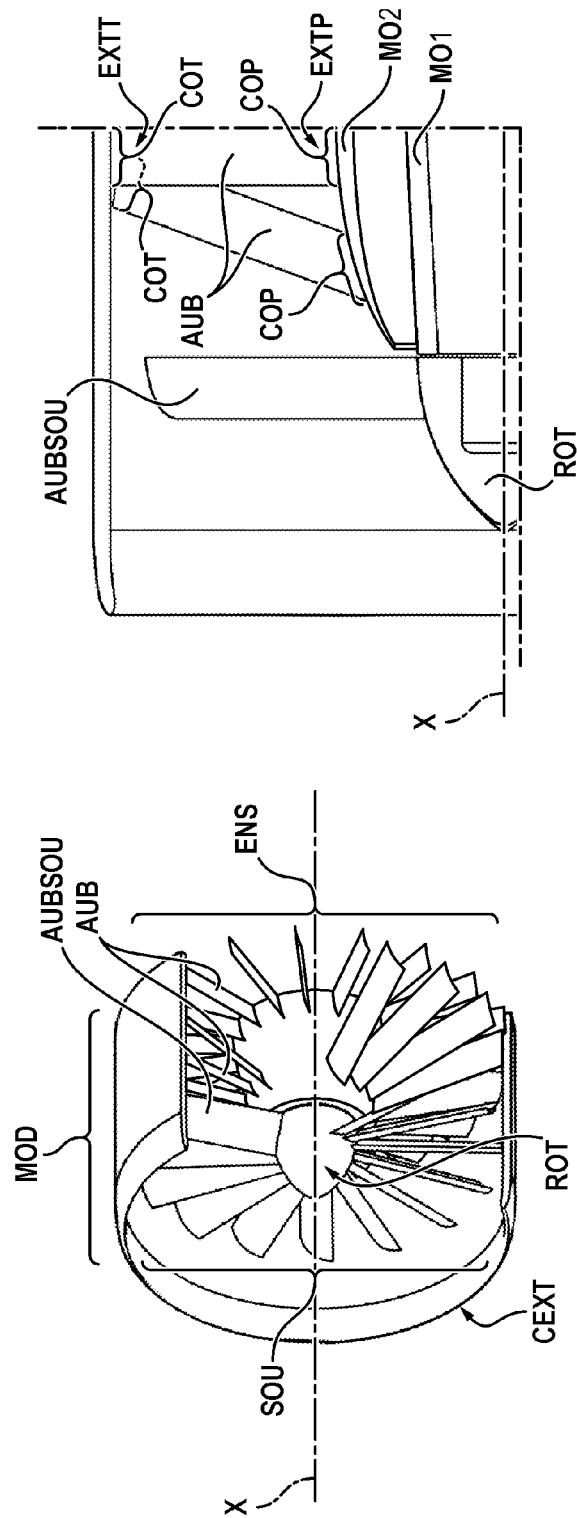
FIG. 5 shows a third embodiment of the module of the invention.

FIG. 5 shows another embodiment of the module MOD. In this embodiment, all the stator vanes AUB are attached, by the root, to the second hub MO2. This second hub MO2 faces internally the secondary stream. The stator assembly ENS straightens only the secondary air flow.

The module MOD is the upstream part of a double flow turbine engine. In this embodiment, the stator vanes EUB allow only the second flow to be straightened.

This allows in particular positioning a primary compressor below the roots of the stator vanes.

Thus this invention allows, in the case of a double-flow fan for supplying a primary flow and a secondary flow, having the splitter nose positioned in three different ways:
  upstream of all the stator vanes AUB, more particularly upstream of the leading edge of all the stator vanes AUB,
  between the trailing edge of the odd numbered stator vanes AUB and the leading edge of the even numbered stator vanes AUB,
  downstream of the stator vanes AUB, more particularly downstream of the trailing edge of all the stator vanes AUB.

The invention claimed is:
1. An assembly comprising a plurality of stator vanes, wherein the assembly is centered on a longitudinal axis and the plurality of stator vanes is distributed circum- ferentially around the longitudinal axis, each stator vane of the plurality of stator vanes extending radially with respect to the longitudinal axis, the longitudinal axis defining a main direction of the assembly, wherein each stator vane of the plurality of stator vanes has a first chord and a second chord, the first chord being taken at a root of the stator vane and the second chord being taken at a tip of the stator vane, the root of the stator vane being closer to the longitudinal axis than the tip of the stator vane, wherein each stator vane of the plurality of stator vanes has an adjacent stator vane that is positioned adjacent to the stator vane in a circumferential direction around the longitudinal axis, wherein, for each stator vane of the plurality of stator vanes, the first chord of the stator vane does not overlap the first chord of the adjacent stator vane in the main direction, and the second chord of the stator vane overlaps the second chord of the adjacent stator vane in the main direction.

2. The assembly of claim 1, wherein, for each stator vane of the plurality of stator vanes, a distance between the tip of the stator vane and the longitudinal axis is identical to a distance between the tip of the adjacent stator vane and the longitudinal axis.

3. The assembly of claim 1, wherein, for each stator vane of the plurality of stator vanes, a distance between the root of the stator vane and the longitudinal axis is identical to a distance between the root of the adjacent stator vane and the longitudinal axis.

4. The assembly of claim 1, wherein, for each stator vane of the plurality of stator vanes, a distance between the root of the stator vane and the longitudinal axis is different from a distance between the root of the adjacent stator vane and the longitudinal axis.

5. A fan module comprising a fan and the assembly of claim 1, wherein the assembly is positioned downstream of the fan.

6. A double flow engine comprising a power generator and the fan module of claim 5.

7. An aircraft comprising the double flow engine of claim 6.

8. A single flow engine comprising a delocalized power generator and the fan module of claim 5.

9. A double flow engine comprising a power generator and the assembly of claim 1.

10. An aircraft comprising the double flow engine of claim 9.

11. A single flow engine comprising a delocalized power generator and the assembly of claim 1.

12. An aircraft comprising the single flow engine of claim 11.

* * * * *